US012572818B2

(12) United States Patent
Aimone et al.

(10) Patent No.: US 12,572,818 B2
(45) Date of Patent: Mar. 10, 2026

(54) DEVICE AND METHOD FOR RANDOM WALK SIMULATION

(71) Applicant: National Technology & Engineering Solutions of Sandia, LLC, Albuquerque, NM (US)

(72) Inventors: James Bradley Aimone, Keller, TX (US); William Mark Severa, Placitas, NM (US); John Darby Smith, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 1218 days.

(21) Appl. No.: 17/200,003

(22) Filed: Mar. 12, 2021

(65) Prior Publication Data

US 2022/0292364 A1 Sep. 15, 2022

(51) Int. Cl.
| *G06N 3/10* | (2006.01) |
| *G06N 3/049* | (2023.01) |
| *G06N 3/063* | (2023.01) |

(52) U.S. Cl.
CPC ............... *G06N 3/10* (2013.01); *G06N 3/049* (2013.01); *G06N 3/063* (2013.01)

(58) Field of Classification Search
CPC ........... G06N 3/10; G06N 3/049; G06N 3/063
See application file for complete search history.

(56) References Cited

U.S. PATENT DOCUMENTS

| 8,943,007 B2 * | 1/2015 | Modha .................... G06N 3/02 |
| | | 706/15 |
| 9,984,326 B1 * | 5/2018 | Chen .................... G06V 10/764 |
| 2014/0052679 A1 * | 2/2014 | Sinyavskiy .............. G06N 3/10 |
| | | 706/44 |

(Continued)

FOREIGN PATENT DOCUMENTS

WO WO-2020215492 A1 * 10/2020 ............. G06T 7/174

OTHER PUBLICATIONS

Raptis et al. (Spike Train Driven Dynamical Models for Human Actions, Aug. 2010, pp. 2077-2084) (Year: 2010).*

*Primary Examiner* — George Giroux
(74) *Attorney, Agent, or Firm* — Yee & Associates, P.C.; Gregory M. Doudnikoff

(57) ABSTRACT

A method for simulating a random walk using spiking neuromorphic hardware is provided. The method comprises receiving, by a buffer count neuron, spiking inputs from upstream mesh nodes, wherein the inputs include information packets comprising information associated with a simulation of a random walk process. A buffer generator neuron generates spikes until the buffer count reaches a first predefined threshold, after which it sends buffer spiking outputs to a spike count neuron. The spike count neuron counts the buffer spiking outputs, and a spike generator neuron generates spikes until the spike count neuron reaches a second specified threshold. The spike generator neuron then sends counter spiking outputs to a probability neuron, which selects downstream mesh nodes to receive the counter spiking outputs, wherein the spiking outputs include updated information packets. The probability neuron then sends the spiking outputs to the selected downstream nodes.

24 Claims, 6 Drawing Sheets

(56) References Cited

U.S. PATENT DOCUMENTS

| | | | |
|---|---|---|---|
| 2014/0074761 A1* | 3/2014 | Hunzinger | G06N 3/049 |
| | | | 706/15 |
| 2014/0122398 A1* | 5/2014 | Richert | G06N 3/02 |
| | | | 706/15 |
| 2015/0161506 A1* | 6/2015 | Levin | G06N 3/08 |
| | | | 706/25 |
| 2018/0174040 A1* | 6/2018 | Davies | G06N 3/084 |
| 2019/0042910 A1* | 2/2019 | Krishnamurthy | G06N 3/049 |
| 2019/0171187 A1* | 6/2019 | Cella | G06N 3/126 |
| 2020/0004902 A1 | 1/2020 | Aimone et al. | |
| 2020/0005120 A1 | 1/2020 | Aimone et al. | |
| 2020/0379958 A1* | 12/2020 | Riggs | G06F 16/2358 |
| 2020/0402198 A1* | 12/2020 | Ray | G06F 9/544 |

* cited by examiner

300

400

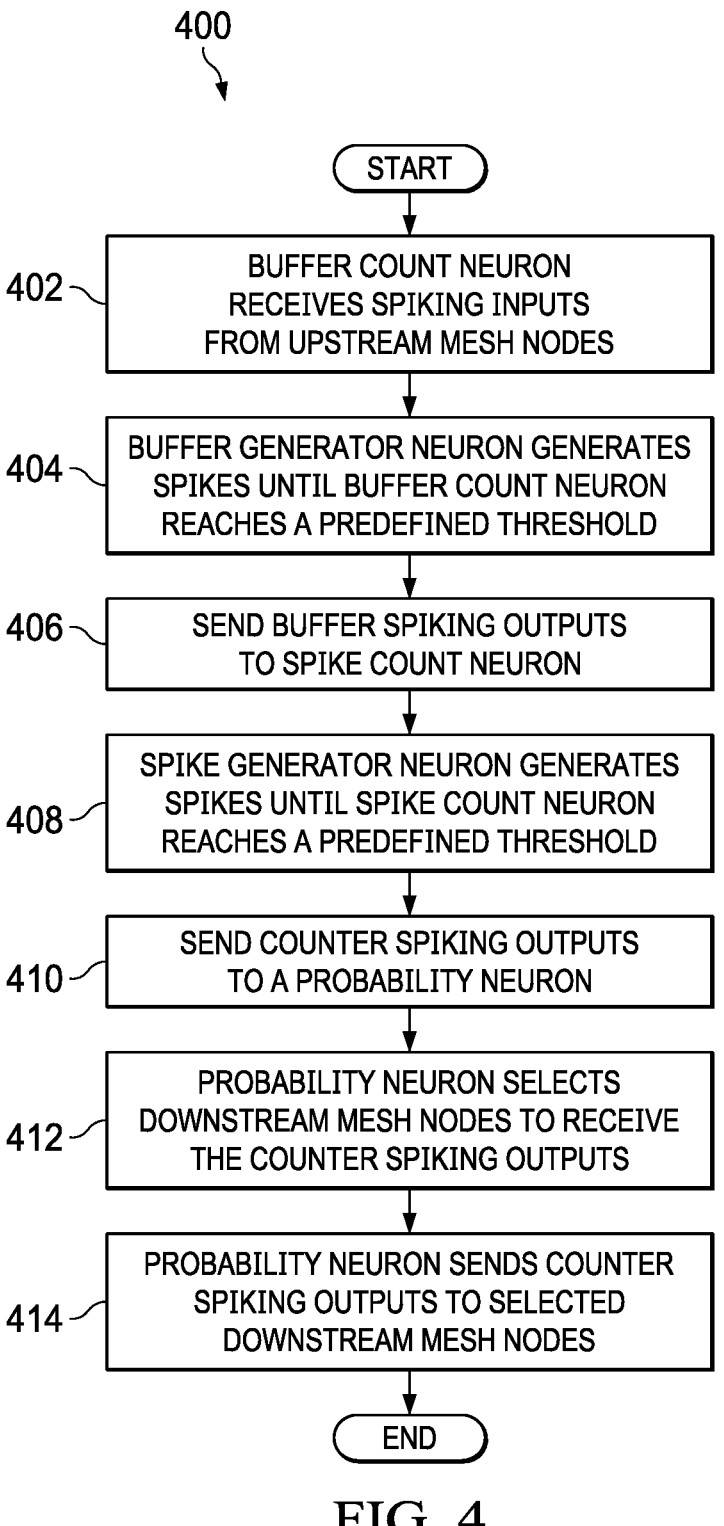

START

402 — BUFFER COUNT NEURON
RECEIVES SPIKING INPUTS
FROM UPSTREAM MESH NODES

404 — BUFFER GENERATOR NEURON GENERATES
SPIKES UNTIL BUFFER COUNT NEURON
REACHES A PREDEFINED THRESHOLD

406 — SEND BUFFER SPIKING OUTPUTS
TO SPIKE COUNT NEURON

408 — SPIKE GENERATOR NEURON GENERATES
SPIKES UNTIL SPIKE COUNT NEURON
REACHES A PREDEFINED THRESHOLD

410 — SEND COUNTER SPIKING OUTPUTS
TO A PROBABILITY NEURON

412 — PROBABILITY NEURON SELECTS
DOWNSTREAM MESH NODES TO RECEIVE
THE COUNTER SPIKING OUTPUTS

414 — PROBABILITY NEURON SENDS COUNTER
SPIKING OUTPUTS TO SELECTED
DOWNSTREAM MESH NODES

END

FIG. 4

DEVICE AND METHOD FOR RANDOM WALK SIMULATION

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

CROSS-REFERENCE TO RELATED APPLICATIONS

This application is related to the following patent applications, hereby incorporated by reference in their entirety: entitled "DEVICES AND METHODS FOR INCREASING THE SPEED AND EFFICIENCY AT WHICH A COMPUTER IS CAPABLE OF MODELING A PLURALITY OF RANDOM WALKERS USING A PARTICLE METHOD," application Ser. No. 16/020,619, filed Jun. 27, 2018, issued as U.S. Pat. No. 11,281,964 B2 on Mar. 33, 2022; and entitled "DEVICES AND METHODS FOR INCREASING THE SPEED AND EFFICIENCY AT WHICH A COMPUTER IS CAPABLE OF MODELING A PLURALITY OF RANDOM WALKERS USING A DENSITY METHOD," application Ser. No. 16/020,627, filed Jun. 27, 2018, issued as U.S. Pat. No. 11,409,922 B2 on Aug. 9, 2022.

BACKGROUND INFORMATION

1. Field

The present disclosure relates generally to device and methods for improved random walk simulation using a neuromorphic architecture.

2. Background

Random walk refers to the stochastic (random) process of taking a sequence of discrete, fixed-length steps in random directions. This process has been used to solve a wide range of numerical computation tasks and scientific simulations. However, the electrical power consumption by a computer simulating a large number of random walkers can be large and can increase heat output, damage equipment, reduce equipment efficiency, slow computations, and waste both cooling power and direct electrical power required to operate the computer. In addition, inefficient computation also leads to the waste of cost and the resources associated with such computation.

Therefore, it would be desirable to have a method and apparatus that take into account at least some of the issues discussed above, as well as other possible issues. For example, it would be desirable to have a method and device that overcome a technical problem with inefficient computation when stimulating the random walk.

SUMMARY

An illustrative embodiment provides a computer-implemented method for simulating a random walk in spiking neuromorphic hardware. The method comprises receiving, by a buffer count neuron, a number of spiking inputs from a number of upstream mesh nodes, wherein the spiking inputs each include an information packet comprising information associated with a simulation of a specific random walk process. A buffer generator neuron in the mesh node, in response to the inputs, generates a first number of spikes until the buffer count neuron reaches a first predefined threshold. Upon reaching the first predefined threshold the buffer generator neuron sends a number of buffer spiking outputs to a spike count neuron in the mesh node. The spike count neuron counts the buffer spiking outputs from the buffer generator neuron. In response to the buffer spiking outputs, a spike generator neuron in the mesh node generates a second number of spikes until the spike count neuron reaches a second predefined threshold. Upon reaching the second predefined threshold, the spike generator neuron sends a number of counter spiking outputs to a probability neuron in the mesh node, wherein the counter spiking outputs each include an information packet comprising updated information associated with the simulation of the specific random walk process. The probability neuron selects a number of downstream mesh nodes to receive the counter spiking outputs generated by the spike generator neuron and sends the counter spiking outputs to the selected downstream mesh nodes.

Another illustrative embodiment provides a computer-implemented method for simulating a random walk in spiking neuromorphic hardware. The method comprises receiving, by a tag circuit in a mesh node, a number of random walk information packets from a number of upstream mesh nodes, wherein the random walk information packets each comprise information associated with spiking activity of a random walk simulation. A buffer count neuron in the mesh node receives a number of spiking inputs from the upstream mesh nodes, wherein each of the information packets is associated with a spiking input. In response to the inputs, a buffer generator neuron in the mesh node generates a first number of spikes until the buffer count neuron reaches a first predefined threshold. Upon reaching the first predefined threshold, the buffer generator neuron sends a number of buffer spiking outputs to a spike count neuron. A spike count neuron in the mesh node counts the buffer spiking outputs from the buffer generator neuron. In response to the buffer spiking outputs a spike generator neuron in the mesh node generates a second number of spikes until the spike count neuron reaches a second specified threshold. Upon reaching the second predefined threshold, the spike generator neuron sends a number of counter spiking outputs to a probability neuron in the mesh node. The probability neuron selects a number of downstream mesh nodes to receive the counter spiking outputs generated by the spike generator neuron and sends the counter spiking outputs to the selected downstream mesh nodes. The tag circuit sends the information packets to the downstream mesh nodes selected by the probability neuron, wherein the information packets are updated with spiking activity of the mesh node.

Another illustrative embodiment provides a spiking neuromorphic mesh node for random walk simulation. The neuromorphic hardware comprises: a tag circuit configured to transmit information packets between mesh nodes, wherein each information packet comprises information associated with spiking activity of a random walk simulation. A buffer circuit comprises a buffer count neuron configured to receive a number of spiking inputs from a number of upstream mesh nodes and a buffer generator neuron configured to generate a first number of spikes until the buffer count neuron reaches a first predefined threshold and, upon reaching the first predefined threshold, generate a number of buffer spiking outputs. A spike circuit comprises a spike count neuron configured to receive and count the buffer spiking outputs from the buffer generator neuron and a spike generator neuron configured to generate a second number of spikes until the spike count neuron reaches a second predefined threshold and, upon reaching the second predefined threshold, generate a number of counter spiking outputs. A probability circuit is configured to receive the counter spiking outputs, select a number of downstream mesh nodes to receive the counter spiking outputs, and send the counter spiking outputs to the selected downstream mesh nodes.

Another illustrative embodiment provides a computer-implemented method for simulating a random walk in spiking neuromorphic hardware. The method comprises receiving, by a neural circuit in a mesh node, a number of spiking inputs from a number of upstream mesh nodes, wherein each spiking input includes an information packet comprising information associated with a simulation of a specific random walk process. The neural circuit buffers the received spiking inputs and generates, in response to the buffered inputs, a number of buffer spikes until the number reaches a predefined threshold. Upon reaching the predefined threshold, the neural circuit sends a number of spiking outputs to a probability neuron in the mesh node, wherein the spiking outputs each include an information packet comprising updated information associated with the simulation of the specific random walk process. The probability neuron selects a number of downstream mesh nodes to receive the counter spiking outputs generated by the spike generator neuron and sends the counter spiking outputs to the selected downstream mesh nodes.

Another illustrative embodiment provides a spiking neuromorphic mesh node for random walk simulation. The mesh node comprises a tag circuit configured to transmit information packets between mesh nodes, wherein each information packet comprises information associated with spiking activity of a random walk simulation. A neural circuit is configured to receive a number of spiking inputs from a number of upstream mesh nodes, buffer the spiking inputs, generate a number of buffer spikes until the number reaches a predefined threshold, and upon reaching the predefined threshold, generate a number of spiking outputs, wherein the spiking outputs each include an information packet comprising updated information associated with the simulation of the specific random walk process. A probability circuit is configured to receive the spiking outputs, select a number of downstream mesh nodes to receive the counter spiking outputs, and send the counter spiking outputs to the selected downstream mesh nodes.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 depicts a flowchart of a process for random walk simulation in a neuromorphic mesh node in accordance with an illustrative embodiment;

DETAILED DESCRIPTION

Figure 1:
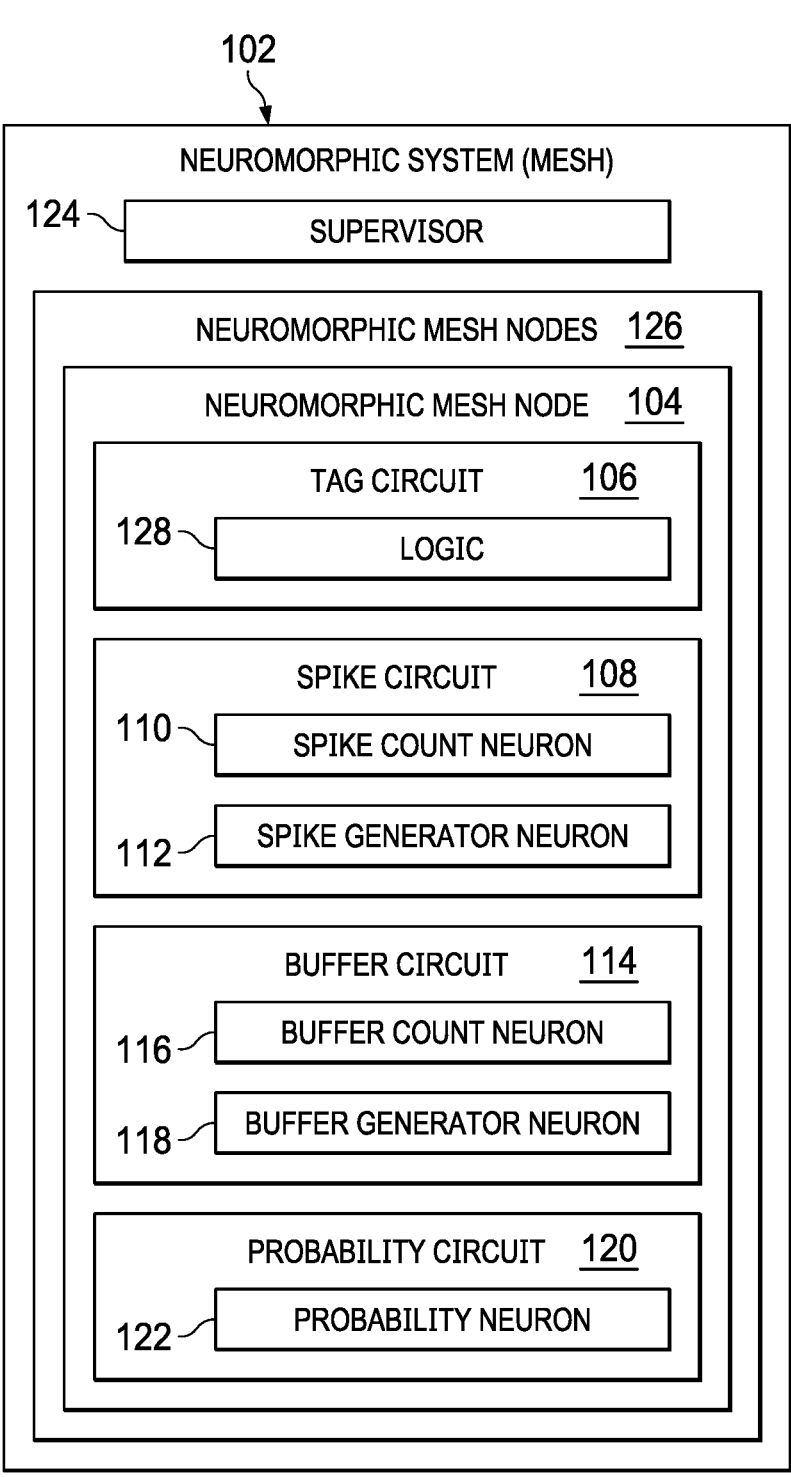
FIG. 1 illustrates a block diagram of a neuromorphic system for Random Walk simulation in accordance with an illustrative embodiment.

The illustrative embodiments recognize and take into account one or more different considerations. For example, the illustrative embodiments recognize and take into account that the random walk models and is a direct reflection of the underlying physical process of Brownian Motion, among other processes. The illustrative embodiments also recognize and take into account that random walks have found myriad applications across a range of scientific disciplines including computer science, mathematics, physics, operations research, and economics. The random walks are often straightforward to implement in an inefficient manner, which independently samples a number of simulations performed across a number of computing devices in a distributed architecture with each computational device responsible for a distinct process. However, the aggregation of a population of walkers present problems because large numbers of information across the computation devices need to be integrated before any conclusion can be made.

The illustrative embodiments recognize and take into account that the electrical power consumption by a computer simulating a large number of random walkers can be large and can increase heat output, damage equipment, reduce equipment efficiency, slow computations, and waste both cooling power and direct electrical power required to operate the computer. In addition, inefficient computation also leads to the waste of cost and the resources associated with such computation.

The illustrative embodiments recognize and take into account that spiking neuromorphic hardware has been purposed to have the potential for being both programmable and highly efficient at solving a diverse set of tasks. Neuromorphic hardware is more specialized than general purpose hardware while also being more programmable than application specific integrated circuits (ASICs). Neuromorphic hardware is particularly advantageous when performing large scale modeling of random walks since independent random walks can be computed in parallel.

The illustrative embodiments recognize and take into account that spiking neuromorphic hardware needs to perform a highly efficient mapping of stochastic processes to balance the parallel computation of neurons and the event-driven spiking communication between them.

Spiking neural networks (SNNs) incorporate the concept of time into their operating model. Whereas other types of neural networks communicate using continuous activation values, communication in SNNs is done by broadcasting trains of action potentials, known as spike trains. In biological systems, a spike is generated when the sum of changes in a neuron's membrane potential resulting from pre-synaptic simulation crosses a threshold. This principle is simulated in artificial SNNs in the form of a signal accumulator that fires when a certain type of input surpasses a threshold.

The intermittent occurrence of spikes gives SNNs the advantage of much lower energy consumption than other types of neural networks. A synapse can be either excitatory (i.e., increases membrane potential) or inhibitory (i.e., decreases membrane potential).

The illustrative embodiments also recognize and take into account that unlike deterministic numerical solution of partial differential equation (PDE), which often rely on relatively few large complex calculations, the solution of random walks typically rely on many simple computations. The illustrative embodiments also recognize and take into account the mathematical observation that a large class of PDEs can be solved by simulating a large number of random walks over a uniform mesh with a set of problem-specific transition matrices. By computing these random walks in bulk, and then averaging them according to an application-specific function, a solution to a PDE can be determined. If these random walks can be obtained efficiently, the overall process has the potential to be both faster and more power-efficient than alternative solutions to solving these problems.

The illustrative embodiments provide a custom neuromorphic architecture for implementing numerical simulation problems, such as solving Monte Carlo simulations or performing graph analytics tasks. The neuromorphic architecture is designed to maintain elements of the programmability of existing neuromorphic architectures, while both removing features that are unnecessary for numerical computing as well as adding some capabilities that will make numerical computing more efficient.

The illustrative embodiments recognize several aspects of generic spiking approaches that may limit the efficiency of this hardware for this application. In particular, the illustrative embodiments recognize that three features not typically in neuromorphic hardware would yield significant benefits. The first feature comprises optimizing local computation at each mesh point for a given application, which can achieve significant gains in performance if a custom ASIC IP core/block is used at each mesh point (as opposed to a set of configurable neurons).

In contrast to typical one-to-many neural communication, in which all targets receive the same message, the second feature comprises allowing a random subset of targets within the architecture to be selected (e.g., 1 of N receives the signal, with some probability distribution), which significantly compresses the number of communication events and computations required in the computation.

The third feature comprises including a "tag" or "color" in a spike. Spiking neural communication is typically one bit, with the source of a spike being effectively forgotten by a downstream neuron. While most architectures transmit a packet of information with a spike (including, for instance, source and target information or delays), the spikes generated by illustrative embodiments also include a tag or color that can be transferred through the computation to maintain the identity of a random walk, or some other path of information movement, which can significantly reduce computing time over conventional spiking architectures.

The illustrative embodiments provide an architecture that adopts these three features, while removing aspects of neural programmability that are unnecessary for the desired functions. At each mesh point, a specific computation is performed that is local to that location. In the case of Markov random walks, the computation is counting the number of walkers to arrive at a location and then be distributed to other locations according to a programmable probability distribution. For other applications, such as graph analytics, the computation may involve some other local computation and a deterministic routing of the information. Each of these specific computations can be performed by a specialized circuit (IP block) tailored to bring in events (model spikes) from connected mesh points and processing accordingly.

The phrase "walker" means a synaptic spike that travels between mesh nodes in a neuromorphic system designed for random walk simulation. Usually, the walker is in form of spiking generated by the circuit or supervisor that activate the neuromorphic system.

The communication between these blocks can be tailored to be a sampling of a transition matrix between mesh points. Specifically, the output of an event at a given mesh point can be sent to a subset of other mesh points, either in a deterministic manner (e.g., these k of K outputs will receive a spike) or in a probabilistic manner (e.g., choose 1 of k (of K) outputs to receive a spike, per a programmed distribution).

In the architecture of the illustrative embodiments, information preserves key aspects of spiking communication. For example, spiking is "all or none," meaning the decision to spike or not is binary and does not carry partial or additional information that are dependent on state (e.g., close to threshold or twice above threshold). Similarly, the illustrative embodiments preserve that all targets, if there are multiple, will receive the same spike signal (no output dependent message). However, unlike conventional architectures, the spiking is set up to carry with it an additional information label, a tag that can be set to provide some history of the spike's trajectory through the mesh. For example, some algorithms may use the tag to encode the originating mesh point (and thus each mesh block transmits the input tag sequence with the output spike), while for other algorithms the tag can be set to identify a previously visited mesh point.

With reference now to the figures and, in particular, with reference to FIG. 1, a block diagram of a neuromorphic system for random walk simulation is depicted in accordance with an illustrative embodiment. In this illustrative example, the neuromorphic system 102 includes a number of mesh nodes 126 located at discrete locations. For simplicity, the neuromorphic system 102 can be considered as a lattice of N grid points along each of D dimensions, where each grid point represents one mesh node 104 (see FIG. 2). Within the neuromorphic system 102 is a population that evolves through a random walk process that is suitable to model as a population of independent spiking (walkers), such as a diffusion process where each spiking (walker) moves through space according to a Brownian motion evolution. In one illustrative example, each walker is independent without interactions. For example, if a simulation models K independent particles, the average position of the K particles approaches the expected value of the population at a rate of $O(1/\sqrt{K})$ as a consequence of the central limit theorem.

In this illustrative example, the neuromorphic system 102 comprises number of neuromorphic mesh nodes 126. In this illustrative example, the neuromorphic system 102 may be configured to be activated by a supervisor 124 to spike a set of spiking inputs to a number of start location mesh nodes.

Each neuromorphic mesh node 104 receives the spiking signal from upstream mesh node and selects at least one mesh node adjacent to it to transmit the spiking signal. Neuromorphic mesh node 104 includes a buffer circuit 114 to process incoming spiking signal from upstream mesh nodes. In this illustrative example, the buffer circuit includes a buffer count neuron 116 to receive spiking inputs from other mesh node outputs. The buffer count neuron 116 represents the cumulative walker density at that location.

In this illustrative example, the buffer count neuron 116 is a neuron with threshold 0 and is configured to count the number of walkers received at mesh node 104. In the present example, walkers are passed from mesh node to mesh node with negative weight. therefore, i.e., a sub-threshold potential of −5 corresponds with 5 walkers at that location.

Buffer circuit 114 also includes a buffer generator neuron 118 configured to continuously spike until the buffer count neuron 116 reaches a threshold. In this illustrative example, the buffer generator neuron 118 is a self-excitatory neuron that counts the walkers stored in the walker counter 116. After being initiated by receiving the upstream signal, the buffer generator neuron 118 sends positively weighted spikes to the buffer count neuron 116 until buffer count neuron 116 hits its threshold.

In this illustrative example, the output of the buffer generator neuron 118 is a buffer spiking output. The number of spikes from the buffer generator neuron 118 equals the number of walkers at that location. The buffer generator neuron 118 then sends the buffer spiking output to a downstream circuit, and the buffer count neuron 116 sends an inhibitory signal to the buffer generator neuron 118 to stop its spiking activity upon reaching the threshold.

In this illustrative example, the buffer count neuron 116 may be further configured to synchronize activity of incoming walkers. Since the walkers may each take a different number of steps and may be received by the buffer count neuron 116 at different timesteps, the incorporation of the synchronization feature keeps all walkers on the same time-step and ensures consistent operation in particular mesh node.

The Neuromorphic mesh node 104 may further include a spike circuit 108. In this illustrative example, the spike circuit 108 has a similar design compare to the buffer circuit 114, with differences on the inputs and outputs. Similarly, the spike circuit 108 includes a spike count neuron 110 to receive spiking inputs from the buffer generator neuron 118.

In this illustrative example, the spike count neuron 110 is also a neuron with threshold 0 and is configured to count the number of walkers received. As explained above, the walkers are passed from mesh node to mesh node with negative weight. Therefore, a sub-threshold potential of −5 corresponds with 5 walkers at that location.

Spike circuit 108 also includes a spike generator neuron 112 configured to continuously spike until the spike count neuron 110 reaches a threshold. In this illustrative example, the spike generator neuron 112 is a self-excitatory neuron that counts the walkers stored in the walker counter 110. After being initiated by receiving the buffer spiking output, the spike generator neuron 112 sends positively weighted spikes to the spike count neuron 110 until spike count neuron 110 hits its threshold.

In this illustrative example, the output of the spike generator neuron 112 is a counter spiking output representing the count of walkers. The spike generator neuron 112 then sends the buffer spiking output to a downstream circuit, and the spike count neuron 110 sends an inhibitory signal to the spike generator neuron 112 to stop its spiking activity upon reaching the threshold.

The Neuromorphic mesh node 104 may also include a probability circuit 120 to select downstream mesh nodes for distribution of the walkers. In this illustrative example, the probability circuit 120 might include a probability neuron 122 designed to use intrinsic pseudo-random number generators (PRNGs) to select only one of the downstream mesh nodes for each walker at an appropriate Markov transition probability.

In this illustrative example, the PRNGs provides a random input onto each neuron on a particular neural core as an 8-bit pseudo-random integer, with potential multiplicative and additive scaling. In one illustrative example, the selection of downstream mesh nodes can be achieved by collapsing a probability tree into a single layer. For example, a uniform three-layer decision tree, with each branch having a 50% probability, produces eight outputs with 12.5% probability. This decision tree can then be compressed into a single layer by having each output node require all positive input branches be active and receive inhibition from all wrong decision branches, with no inputs from the branches on the other side of the decision tree.

The neuromorphic mesh node 104 may also include a tag circuit 106 to process an information packet received from upstream mesh node. Tag circuit 106 might operate as a first in first out (FIFO) buffer. In this illustrative example, the information packet may include information associated with spiking activity of random walk simulation. The information packet may also include programmed instructions to track or regulate spiking activity of the mesh node. Tag circuit 106 might further comprise logic 128 configured to change information in the tags. For example, logic 128 might increment the count number of a walker, change the label to encode current location (i.e., path history through mesh), or change the label to change walker properties that can be used in random walk (e.g., decrease walker "energy"). The functions provided by logic 128 might be used to facilitate synchronization of spikes. In an illustrative embodiment, the use of logic 128 in tag circuit 106 can obviate the need for buffer circuit 114, thereby reducing the number of neurons in neuromorphic system 102.

Spike circuit 108 and buffer circuit 114 may further include a relay neuron, which is presented to account for the subtle timing between the corresponding generator neuron and count neurons that provide the extra signal from the generator neuron and performs auto-correction when there are no walkers received by the neuromorphic mesh node 104.

Figure 2:
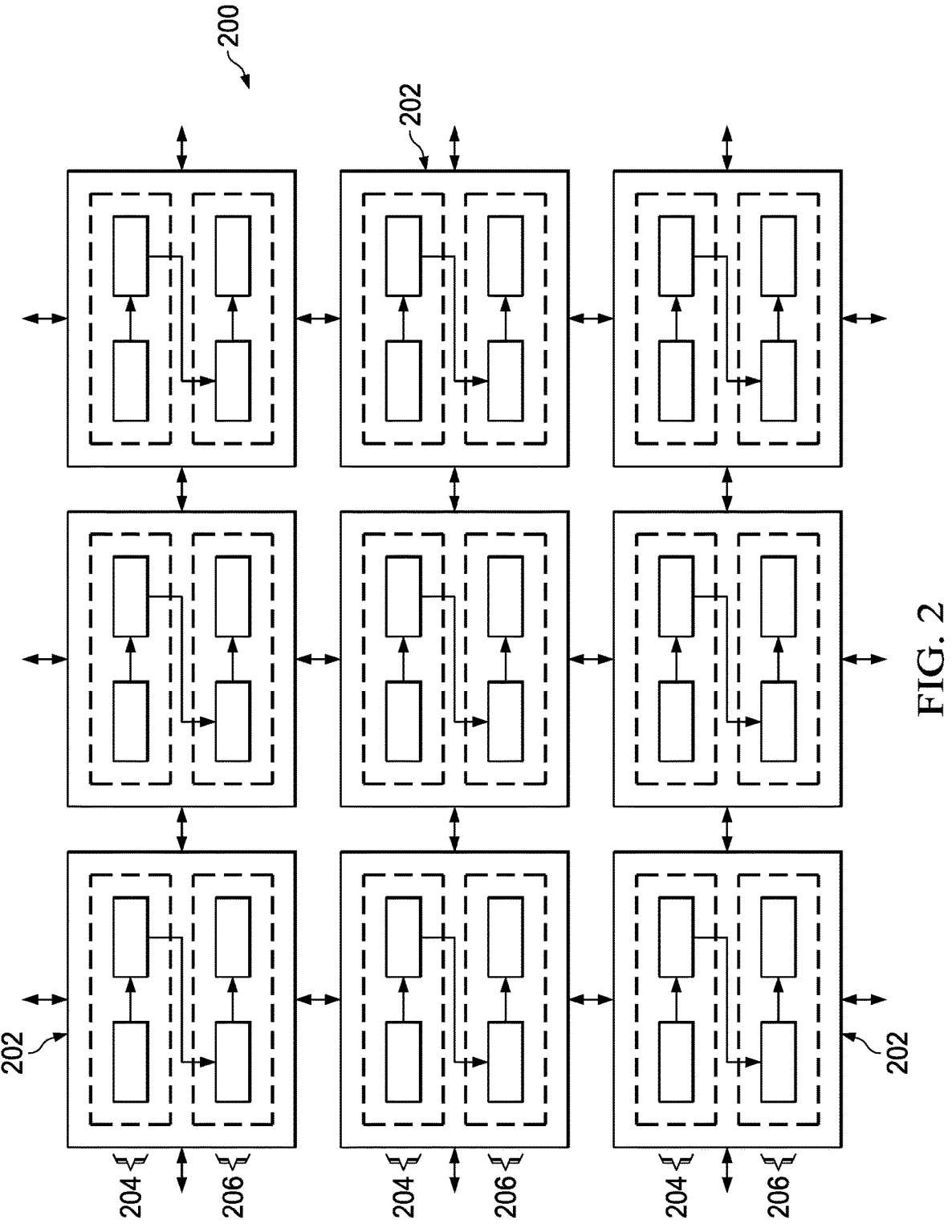
FIG. 2 illustrates a neuromorphic mesh in accordance with an illustrative embodiment.

FIG. 2 illustrates a neuromorphic mesh 200 in accordance with an illustrative embodiment. In this example, each mesh node 202 receives a walker at a buffer circuit 204 and generates an output from spike circuit 206. In the present example, the walker can be outputted to any adjacent mesh node. Once the adjacent mesh node receives the walker, the same operation is repeated.

Figure 3:
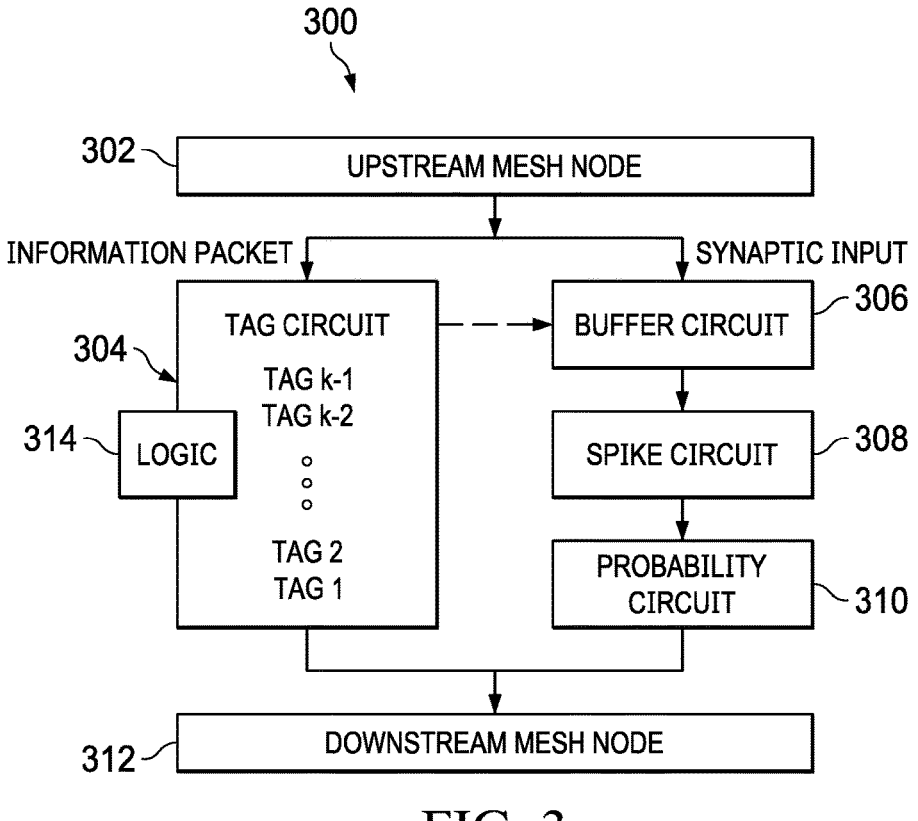
FIG. 3 illustrates a neuromorphic mesh node architecture in accordance with an illustrative embodiment.

With reference next to FIG. 3, an illustration of walker transmission in a neuromorphic mesh node. In this illustrative example, an upstream mesh node 302 outputs a spiking input in the form of a spike along with an information packet (tag). As explained above, the spiking input is received by a buffer circuit 306 in which a buffer generator neuron will continuously generate spikes until a buffer count neuron reaches its threshold. The buffer circuit 306 then outputs buffer spiking outputs to a spike circuit 308. A spike generator neuron in spike circuit 308 will continuously generate spikes until a spike count neuron reaches its threshold. The spike circuit 308 then outputs a counter spiking output to a probability neuron in probability circuit 310. The probability circuit 310 then selects at least one downstream mesh node to send the information packet and the counter spiking output.

Tag circuit 304 operates in parallel while the walker is transmitted through buffer circuit 306, spike circuit 308, and probability circuit 310. In this illustrative example, tag circuit 304 may be in communication with buffer circuit 306, spike circuit 308, and probability circuit 310. Tag circuit 304 may utilize the information packet to track and update the spiking activity associated the random walk simulation within the mesh node after tag circuit 304 receives the information packet from upstream mesh node 302. The information stored in the information packet may be static information, for example, the tag circuit may keep track of starting location of walkers and keep track of starting time-point of walkers. The information packet may also include programmed instructions to regulate the spiking activity within the mesh node, which can be executed by logic 314. For example, the neuromorphic mesh mode may utilize the information packet with programed instructions to synchronize incoming walkers from different timesteps by having the tag circuit 304 communicate with buffer circuit 306 to achieve more efficient walker synchronization. Alternatively, the information packet may include programed instructions to increase the count of the walker being outputted to a particular downstream mesh node. The information packet may reduce the need for buffering depending on the algorithm in question. For example, given a starting location and a specified target location, the time required for the different walkers to arrive at the target can be determined by encoding the number of timesteps taken within the tag. The simulation can then be run asynchronously (without a buffer) and stopped once all the walkers have reached the target location.

In an alternate embodiment, the functions of buffer circuit 306 and spike circuit 308 may be incorporated into a common neural circuit. Combining the buffer functions with the spiking functions may be implemented with more powerful neurons or with a circuit of neurons that emulate the buffer functions.

Logic operations performed by logic 314 in tag circuit 304 can reduce energy consumption because calculations can be performed in less overall time with less neurons. These program instructions and static information are only presented as examples and not meant to limit the types of tag information that can be implemented.

In this illustrative example, tag circuit 304 sends the updated information packet to the downstream mesh node selected by probability circuit 310. The tag circuit 304 allows the neuromorphic hardware to run multiple variants of a random walk simulation simultaneously.

FIG. 4 depicts a flowchart of a process for random walk simulation in a neuromorphic mesh node in accordance with an illustrative embodiment. The illustration in FIG. 4 is an example of one manner in which the random walk simulation can be implemented. Process 400 might be implemented in hardware, software, or both. When implemented in software, the process can take the form of program code that is run by one of more processors located in one or more hardware devices in one or more computer systems. Process 400 might be implemented in neuromorphic system 102 shown in FIG. 1 and neuromorphic walker node architecture 300 shown in FIG. 3. As depicted, process 400 can be implemented with or without a tag circuit.

Process 400 begins by a buffer count neuron within a buffer circuit receiving a number of spiking inputs from a number of upstream mesh nodes (step 402). In step 402, the reception of upstream spiking input activates a buffer circuit supervisor. Initially, the buffer count neuron is defined with threshold 0 and is configured to count the number of walkers received. As depicted above, the walkers are passed from mesh node to mesh node with negative weight. therefore, a sub-threshold potential of −5 corresponds with 5 walkers at that location. In this illustrative example, the buffer neuron may also perform synchronization of walkers to make sure they are sent to downstream at same timestep.

After the buffer circuit supervisor is activated by reception of walker from upstream mesh node, a buffer generator neuron within the buffer circuit continuously generates spikes until the buffer count neuron reaches a predefined threshold (step 404). In this illustrative example, upon reaching the threshold, the buffer count neuron sends an inhibitory signal to the buffer generator circuit to stop its spiking activity. Upon reaching the predefined threshold, the buffer count neuron sends a number of buffer spiking outputs to a spike circuit in the mesh node (step 406). The buffer spiking outputs represent the number of walkers (spiking inputs) received from upstream mesh nodes.

The spike circuit receives the buffer spiking outputs, and a spike generator neuron within the spike circuit continuously generates spikes until the spike count neuron reaches a second predefined threshold (step 408). Similar to the buffer count neuron, the spike count neuron sends an inhibitory signal to the spike generator circuit to stop its spiking activity upon reaching the threshold.

Upon reaching the second predefined threshold, the spike generator neuron sends a number of counter spiking outputs, representing the number of walkers, to a probability neuron within a probability circuit (step 410). In this illustrative example, the probability neuron selects downstream mesh nodes to receive the counter spiking outputs (step 412). The determination of downstream mesh nodes may be achieved by any suitable algorithms, for example, a probability tree as depicted above. The probability neuron then sends the counter spiking outputs to the selected downstream mesh nodes (step 414). Process 400 terminates thereafter.

Figure 5:
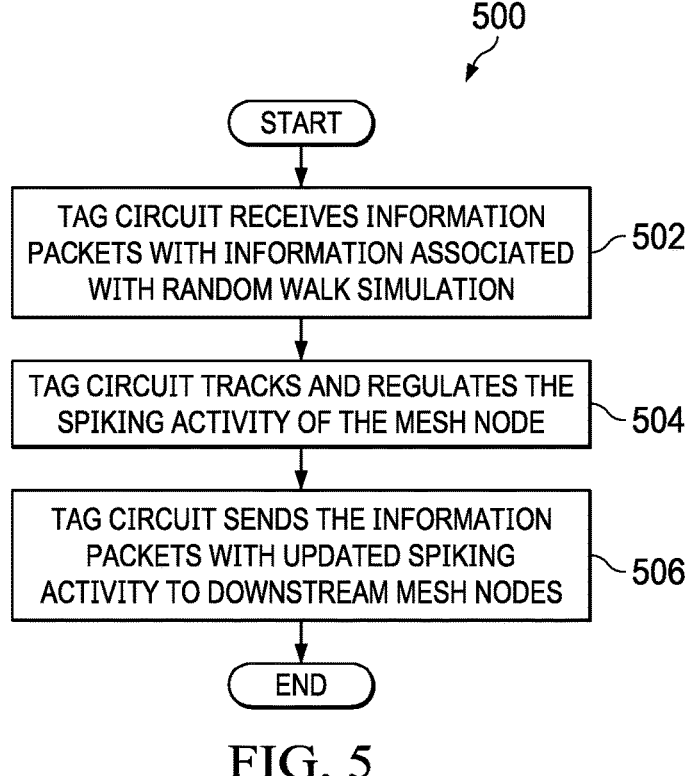
FIG. 5 depicts a flowchart of a process for information packet operation within a tag circuit in accordance with an illustrative embodiment.

FIG. 5 depicts a flowchart of a process for information packet operation within a tag circuit in accordance with an illustrative embodiment. Process 500 might be implemented in hardware, software, or both. When implemented in software, the process can take the form of program code that is run by one of more processors located in one or more hardware devices in one or more computer systems. Process 500 might be implemented in neuromorphic system 102 shown in FIG. 1 and neuromorphic walker node architecture 300 shown in FIG. 3.

Process 500 begins by the tag circuit receiving a number of information packets from a number of upstream mesh nodes (step 502). In this illustrative example, each information packet may be a high-precision packet that includes information associated with random walk simulation performed in upstream mesh nodes. As explained above, the tag circuit may be in communication with the buffer circuit, spike circuit, and probability circuit.

The tag circuit utilize the information packets to track and regulate the spiking activity in the mesh node (step 504). The information stored in the information packets may be static information. For example, the tag circuit may keep track of a starting location and a starting time-point of walkers. The information packet may also include programmed instructions to regulate the spiking activity within the mesh node, e.g., synchronize incoming walkers from different timesteps by having the tag circuit communicate with the buffer circuit to achieve more efficient walker synchronization. As another example, the information packet may include programed instruction to increase the count of walkers being outputted to a particular downstream mesh node.

The tag circuit then sends the information packets with updated spiking activity of the random walk simulation to downstream mesh nodes determined by the probability circuit (step 506). Process 500 terminates thereafter.

Figure 6:
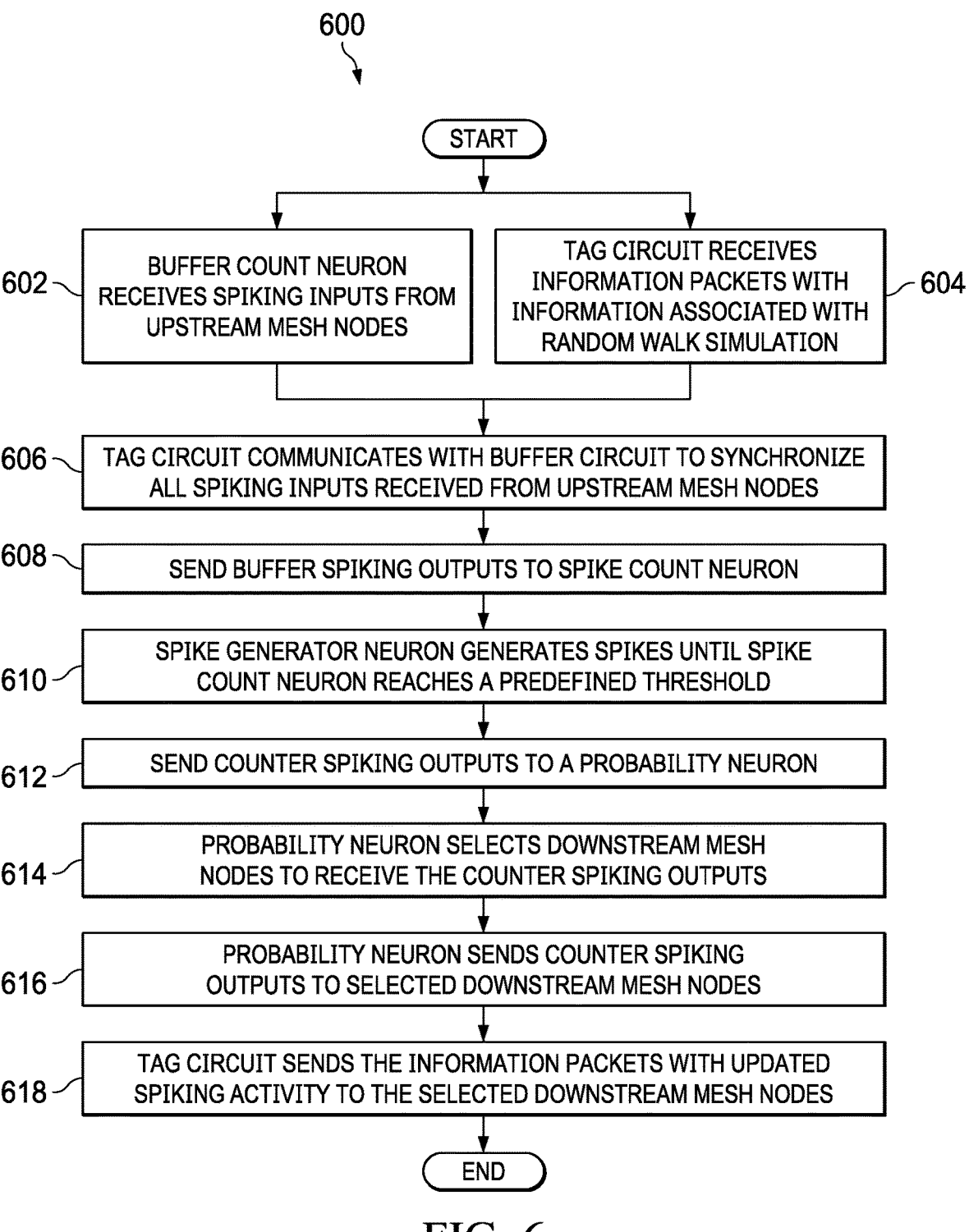
FIG. 6 depicts a flowchart of a process for random walk simulation with a tag circuit performing walker synchronization in a mesh node in accordance with an illustrative embodiment.

FIG. 6 depicts a flowchart of a process for random walk simulation with a tag circuit performing walker synchronization in a mesh node in accordance with an illustrative embodiment. Process 600 might be implemented in hardware, software, or both. When implemented in software, the process can take the form of program code that is run by one of more processors located in one or more hardware devices in one or more computer systems. Process 600 might be implemented in neuromorphic system 102 shown in FIG. 1 and neuromorphic walker node architecture 300 shown in FIG. 3.

Process 600 begins by the buffer count neuron receiving a number of spiking inputs from a number of upstream mesh nodes (step 602), and the tag circuit receives a number of information packets with information associated with random walk simulation by upstream mesh nodes (step 604). If a model is being run without buffering (e.g., using tag information to track the number of timesteps each walker takes), spiking inputs from upstream mesh nodes are received directly by the spike count neuron.

In this illustrative example, the information packets may include programmed instructions for walker synchronization. Specifically, the tag circuit is in communication with the buffer circuit to synchronize all spiking activity associated with the spiking inputs received by the buffer circuit at different timesteps (step 606). The buffer circuit then outputs a number of buffer spiking outputs, representing the count of walkers, to a spike count neuron within a spike circuit (step 608).

Upon receiving the buffer spiking outputs, a spike generator neuron generates a number of spikes until the spike count neuron reaches a predefined threshold (step 610). In this illustrative example, the buffer count neuron sends an inhibitory signal to the buffer generator circuit to stop its spiking activity upon reaching the threshold.

The spike generator neuron then outputs a number of counter spiking outputs, representing the number of walkers, to a probability neuron within a probability circuit (step 612). The probability neuron selects a number of downstream mesh nodes to receive the counter spiking outputs (step 614). In this illustrative example, the determination of downstream mesh nodes may be achieved by any suitable algorithms, for example, a probability tree as depicted above. The probability neuron then sends the counter spiking outputs to the selected downstream mesh nodes (step 616).

The tag circuit updates the information packet with the spiking activity within the mesh node and sends the information packet to the downstream mesh nodes (step 618). In this illustrative example, the tag circuit may be in communication with the buffer circuit, spike circuit and probability circuit. As depicted above, the tag circuit may utilize the information packet to track and regulate the spiking activity in the mesh node. In another illustrative example, multiple information packets may be received by the tag circuit when multiple spiking inputs are received from an upstream mesh node. Each information packet is labelled with a unique identifier associated with its corresponding walker and outputted to the selected downstream mesh node along with its corresponding walker. In application in which a walker is split into two, the new walker may take information from the parent walker's tag. Process 600 then ends.

Figure 7:
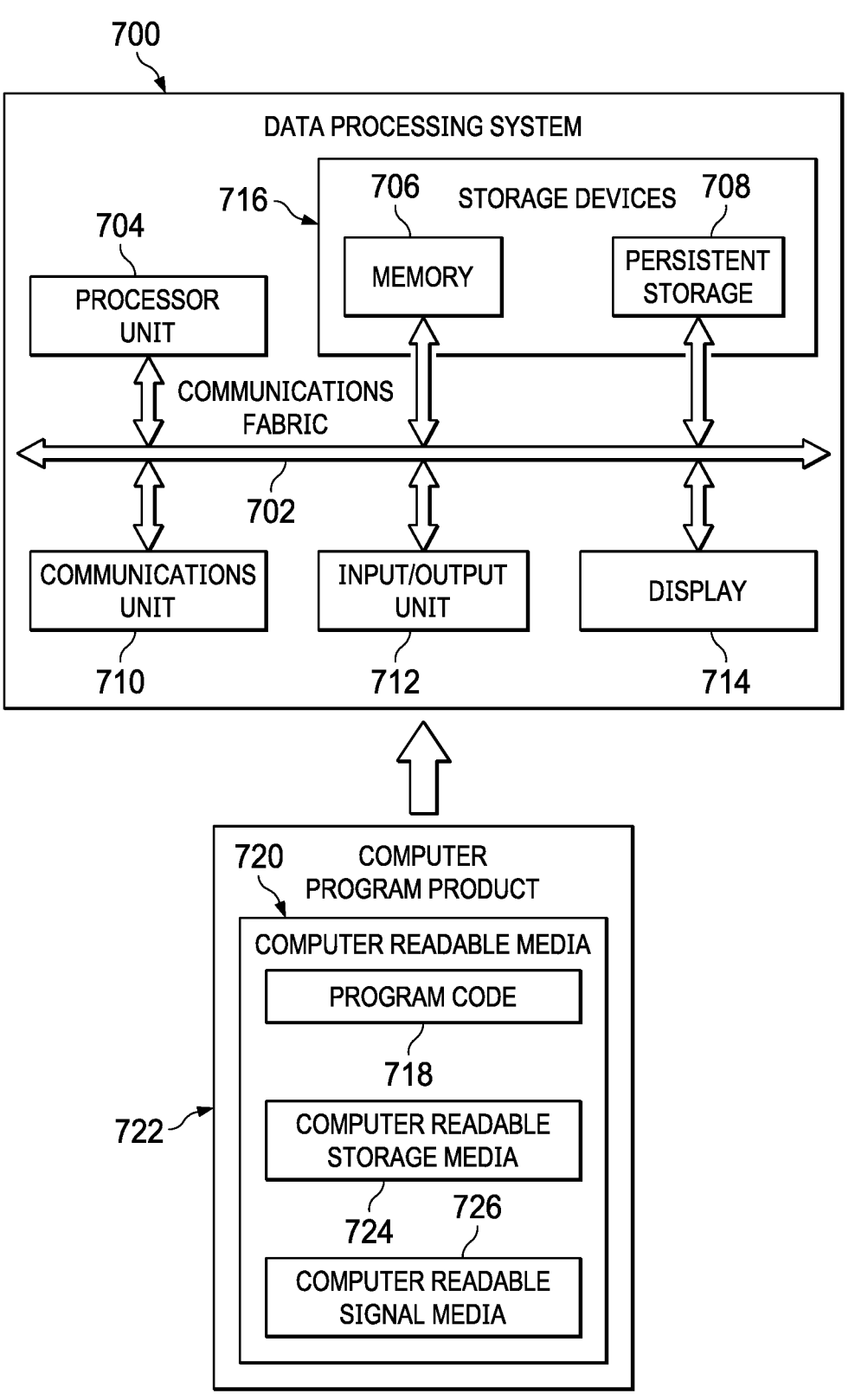
FIG. 7 is a block diagram of a data processing system in accordance with an illustrative embodiment.

Turning now to FIG. 7, a block diagram of a data processing system is depicted in accordance with an illustrative embodiment. Data processing system 700 can also be used to implement one or more data processing systems in neuromorphic system 102 in FIG. 1. In this illustrative example, data processing system 700 includes communications framework 702, which provides communications between processor unit 704, memory 706, persistent storage 708, communications unit 710, input/output (I/O) unit 712, and display 714. In this example, communications framework 702 takes the form of a bus system.

Processor unit 704 serves to execute instructions for software that can be loaded into memory 706. Processor unit 704 includes one or more processors. For example, processor unit 704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 704 can may be implemented using one or more heterogeneous processor systems in which a main processor is present with secondary processors on a single chip. As another illustrative example, processor unit 704 can be a symmetric multiprocessor system containing multiple processors of the same type on a single chip.

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, can be, for example, a random-access memory or any other suitable volatile or non-volatile storage device. Persistent storage 708 may take various forms, depending on the particular implementation.

For example, persistent storage 708 may contain one or more components or devices. For example, persistent storage 708 can be a hard drive, a solid-state drive (SSD), a flash memory, a rewritable optical disk, a rewritable magnetic tape, or some combination of the above. The media used by persistent storage 708 also can be removable. For example, a removable hard drive can be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that can be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs can be located in storage devices 716, which are in communication with processor unit 704 through communications framework 702. The processes of the different embodiments can be performed by processor unit 704 using computer-implemented instructions, which may be located in a memory, such as memory 706.

These instructions are referred to as program code, computer usable program code, or computer-readable program code that can be read and executed by a processor in processor unit 704. The program code in the different embodiments can be embodied on different physical or computer-readable storage media, such as memory 706 or persistent storage 708.

Program code 718 is located in a functional form on computer-readable media 720 that is selectively removable and can be loaded onto or transferred to data processing system 700 for execution by processor unit 704. Program code 718 and computer-readable media 720 form computer program product 722 in these illustrative examples. In the illustrative example, computer-readable media 720 is computer-readable storage media 724.

In these illustrative examples, computer-readable storage media 724 is a physical or tangible storage device used to store program code 718 rather than a medium that propagates or transmits program code 718.

Alternatively, program code 718 can be transferred to data processing system 700 using a computer-readable signal media. The computer-readable signal media can be, for example, a propagated data signal containing program code 718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 720" can be singular or plural. For example, program code 718 can be located in computer-readable media 720 in the form of a single storage device or system. In another example, program code 718 can be located in computer-readable media 720 that is distributed in multiple data processing systems. In other words, some instructions in program code 718 can be located in one data processing system while other instructions in program code 718 can be located in one data processing system. For example, a portion of program code 718 can be located in computer-readable media 720 in a server computer while another portion of program code 718 can be located in computer-readable media 720 located in a set of client computers.

The different components illustrated for data processing system 700 are not meant to provide architectural limitations to the manner in which different embodiments can be implemented. In some illustrative examples, one or more of the components may be incorporated in or otherwise form a portion of, another component. For example, memory 706, or portions thereof, may be incorporated in processor unit 704 in some illustrative examples. The different illustrative embodiments can be implemented in a data processing system including components in addition to or in place of those illustrated for data processing system 700. Other components shown in FIG. 7 can be varied from the illustrative examples shown. The different embodiments can be implemented using any hardware device or system capable of running program code 718.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for simulating a random walk in spiking neuromorphic hardware, the method comprising:

using a number of processors to perform the steps of:

receiving, by a buffer count neuron in a mesh node, a number of spiking inputs from a number of upstream mesh nodes, wherein each spiking input comprises a tag that provides a full history of a trajectory from an origin of the spiking input and information associated with synchronizing spikes in a simulation of a specific random walk process;

generating, by a buffer generator neuron in the mesh node in response to the number of spiking inputs, a first number of the spikes until the buffer count neuron reaches a first predefined threshold;

upon reaching the first predefined threshold, sending, by the buffer generator neuron, a number of buffer spiking outputs to a spike count neuron in the mesh node;

counting, by the spike count neuron, the buffer spiking outputs from the buffer generator neuron;

generating, by a spike generator neuron in the mesh node in response to the buffer spiking outputs, a second number of the spikes until the spike count neuron reaches a second predefined threshold;

upon reaching the second predefined threshold, sending, by the spike generator neuron, a number of counter spiking outputs comprising the tag to a probability neuron in the mesh node, wherein the number of counter spiking outputs each include an information packet comprising updated information associated with a simulation of the specific random walk process;

compressing communication events and computations by selecting, by the probability neuron, a random number of downstream mesh nodes to receive the counter spiking outputs generated by the spike generator neuron; and sending, by the probability neuron, the counter spiking outputs to the random number of downstream mesh nodes selected.

2. The method of claim 1, further comprising:

activating the neuromorphic hardware by a supervisor spiking a set of spiking inputs to a number of start location mesh nodes; and performing, by a circuit at each mesh node respectively, a specific computation that is local to the mesh node.

3. The method of claim 1, wherein the buffer count neuron and the spike count neuron are further configured to produce an inhibitory output signal to stop activities of the buffer generator neuron and the spike generator neuron, respectively, when thresholds for the buffer generator neuron and the spike generator neuron are reached.

4. The method of claim 1, further comprising;

the buffer count neuron receiving and synchronizing spiking inputs from multiple upstream mesh nodes; and running the simulation asynchronously.

5. The method of claim 1, wherein the downstream mesh nodes are selected using a probability tree.

6. The method of claim 1, wherein the probability neuron is configured to select multiple downstream mesh nodes to send the number of counter spiking output generated by the spike generator neuron.

7. The method of claim 1, wherein each information packet further comprises programmed instructions configured to track and regulate spiking activity in the mesh node.

8. A computer-implemented method for simulating a random walk in spiking neuromorphic hardware, the method comprising:

using a number of processors to perform the steps of:

receiving, by a tag circuit in a mesh node, a number of random walk information packets comprising a full history, respectively, of a trajectory of a spiking input from its origin and through a number of upstream mesh nodes, wherein the random walk information packets each comprise information synchronizing spiking activity of a random walk simulation;

receiving, by a buffer count neuron in the mesh node, a number of spiking inputs from the upstream mesh nodes, wherein each of the random walk information packets is associated with a spiking input;

generating, by a buffer generator neuron in the mesh node in response to the number of spiking inputs, a first number of spikes until the buffer count neuron reaches a first predefined threshold;

upon reaching the first predefined threshold, sending, by the buffer generator neuron, a number of buffer spiking outputs to a spike count neuron;

counting, by a spike count neuron in the mesh node, the buffer spiking outputs from the buffer generator neuron;

generating, by a spike generator neuron in the mesh node in response to the buffer spiking outputs, a second number of spikes until the spike count neuron reaches a second predefined threshold;

upon reaching the second predefined threshold, sending, by the spike generator neuron, a number of counter spiking outputs to a probability neuron in the mesh node;

compressing communication events and computations by selecting, by the probability neuron, a random number of downstream mesh nodes to receive the counter spiking outputs generated by the spike generator neuron;

sending, by the probability neuron, the counter spiking outputs to the random number of downstream mesh nodes selected; and sending, by the tag circuit, the random walk information packets to the random number of downstream mesh nodes selected by the probability neuron, wherein the random walk information packets are updated with spiking activity of the mesh node.

9. The method of claim 8, further comprising:

activating the spiking neuromorphic hardware by a supervisor spiking a set of spiking inputs to a number of start location mesh nodes; and performing, by a circuit at each mesh node respectively, a specific computation that is local to the mesh node.

10. The method of claim 8, wherein the buffer count neuron and the spike count neuron are further configured to produce an inhibitory output signal to stop the spiking activities of the buffer generator neuron and the spike generator neuron, respectively, when thresholds for the buffer generator neuron and the spike generator neuron are reached.

11. The method of claim 8, further comprising running a random walk simulation asynchronously.

12. The method of claim 8, further comprising selecting the random number of downstream mesh nodes using a probability tree.

13. The method of claim 8, wherein the probability neuron is configured to select multiple downstream mesh nodes to send the number of counter spiking output outputs generated by the spike generator neuron.

14. The method of claim 8, wherein the tag circuit is configured to allow the neuromorphic hardware to run multiple variants of a random walk simulation simultaneously.

15. A spiking neuromorphic mesh node configured to execute a random walk simulation, wherein the spiking neuromorphic mesh node comprises:

a tag circuit configured to transmit information packets between mesh nodes, wherein each information packet comprises a full history of a trajectory of a spiking input from its origin and information associated with synchronizing spiking activity of the random walk simulation;

a buffer circuit, that comprises:

a buffer count neuron configured to receive a number of spiking inputs from a number of upstream mesh nodes;

a buffer generator neuron configured to generate a first number of spikes until the buffer count neuron reaches a first predefined threshold and, upon reaching the first predefined threshold, generate and synchronize a number of buffer spiking outputs;

a spike circuit, that comprises:

a spike count neuron configured to receive and count the buffer spiking outputs from the buffer generator neuron;

a spike generator neuron configured to generate a second number of spikes until the spike count neuron reaches a second predefined threshold and, upon reaching the second predefined threshold, generate a number of counter spiking outputs; and a probability circuit configured to:

compress communication events and computations; and receive the counter spiking outputs, select a random number of downstream mesh nodes to receive the counter spiking outputs, and send the counter spiking outputs to the selected random number of downstream mesh nodes.

16. The spiking neuromorphic mesh node of claim 15, wherein:

the mesh node is configured for activation by a supervisor configured to spike a set of spiking inputs to a number of start location mesh nodes; and a circuit is located at each mesh mode respectively and configured to perform a specific computation that is local to the mesh mode.

17. The spiking neuromorphic mesh node of claim 15, wherein the buffer count neuron and the spike count neuron are further configured to produce an inhibitory output signal to stop the spiking activities of the buffer generator neuron and the spike generator neuron, respectively, when thresholds for the buffer generator neuron and the spike generator neuron are reached.

18. The spiking neuromorphic mesh node of claim 15, wherein each information packet, respectively, further comprises programmed instructions configured to regulate spiking activity in the mesh node.

19. The spiking neuromorphic mesh node of claim 15, wherein the downstream mesh node is selected using a probability tree.

20. The spiking neuromorphic mesh node of claim 15, wherein the probability circuit is configured to select multiple downstream mesh nodes to send the number of counter spiking outputs generated by the spike generator neuron.

21. The spiking neuromorphic mesh node of claim 15, wherein the tag circuit is configured to allow the mesh node to run multiple variants of a random walk simulation simultaneously.

22. The spiking neuromorphic mesh node of claim 15, wherein the information packet further comprises programmed instruction configured to track and regulate spiking activity in the mesh node.

23. A computer-implemented method for simulating a random walk in spiking neuromorphic hardware, the method comprising:

using a number of processors to perform the steps of:

receiving, by a neural circuit in a mesh node, a number of spiking inputs from a number of upstream mesh nodes, wherein each spiking input includes an information packet comprising a full history of a trajectory of a spiking input from its origin and information associated with synchronizing spikes in a simulation of a specific random walk process;

buffering, by the neural circuit, the received spiking inputs;

generating, by the neural circuit in response to the received spiking inputs buffered, a number of buffer spikes until the number of buffer spikes reaches a predefined threshold;

upon reaching the predefined threshold, send, by the neural circuit, a number of spiking outputs to a probability neuron in the mesh node, wherein the spiking outputs each include an information packet comprising updated information associated with the simulation of the specific random walk process;

compressing communication events and computations by selecting, by the probability neuron, a random number of downstream mesh nodes to receive the spiking outputs; and sending, by the probability neuron, the spiking outputs to the random number of downstream mesh nodes selected.

24. A spiking neuromorphic mesh node configured to execute random walk simulation, wherein the mesh node comprises comprising:

a tag circuit configured to transmit information packets between mesh nodes, wherein each information packet comprises a full history of a trajectory of spiking input from its origin and information associated with synchronizing spiking activity of a random walk simulation;

a neural circuit configured to:

receive a number of spiking inputs from a number of upstream mesh nodes;

buffer the spiking inputs;

generate a number of buffer spikes until the number of buffer spikes reaches a predefined threshold; and upon reaching the predefined threshold, generate a number of spiking outputs, wherein the spiking outputs each include an information packet comprising updated information associated with the simulation of the random walk; and a probability circuit configured to:

receive the spiking outputs;

select a random number of downstream mesh nodes to receive the spiking outputs; and send the spiking outputs to the selected random number of downstream mesh nodes.

* * * * *